Sheet 1-2 Sheets.
J. Marden.
9077X
Balance Scales.
Patented Sept. 9, 1835.
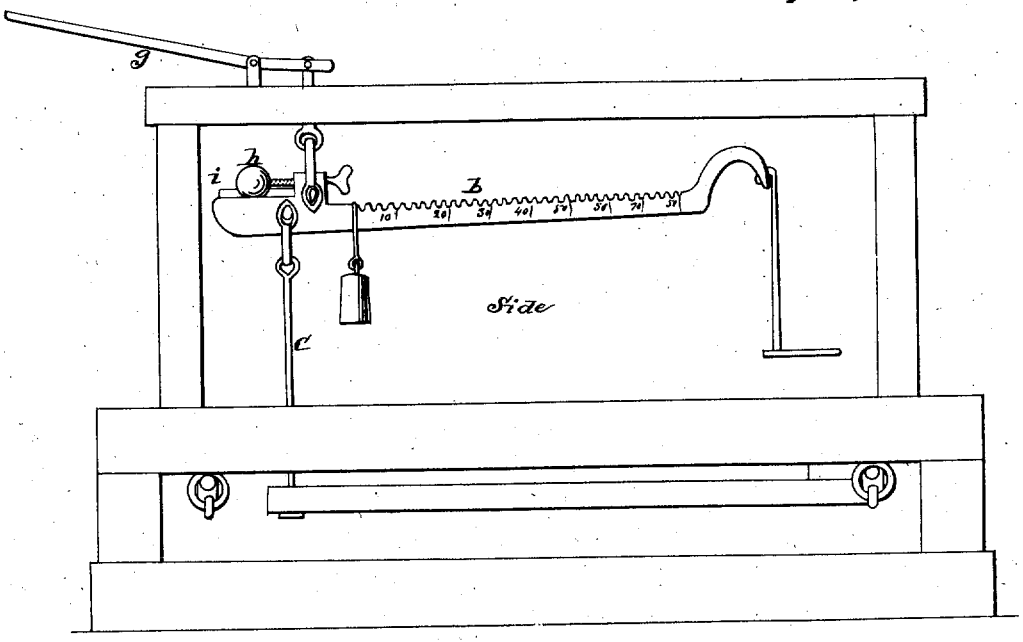
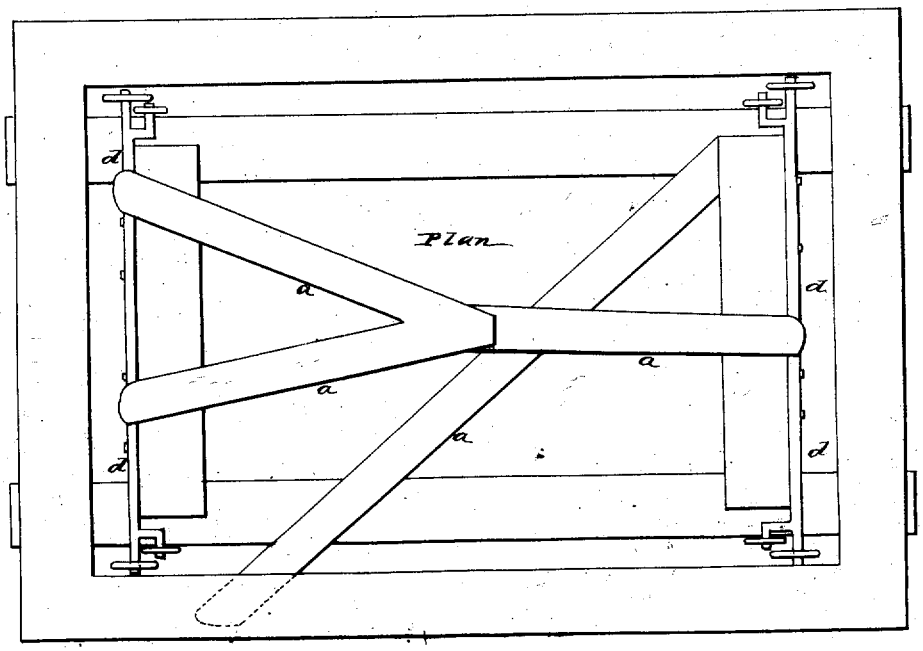

9077X
Sheet 2-2 Sheets.
J. Marden.
Balance Scales.
Patented Sept. 9, 1835.
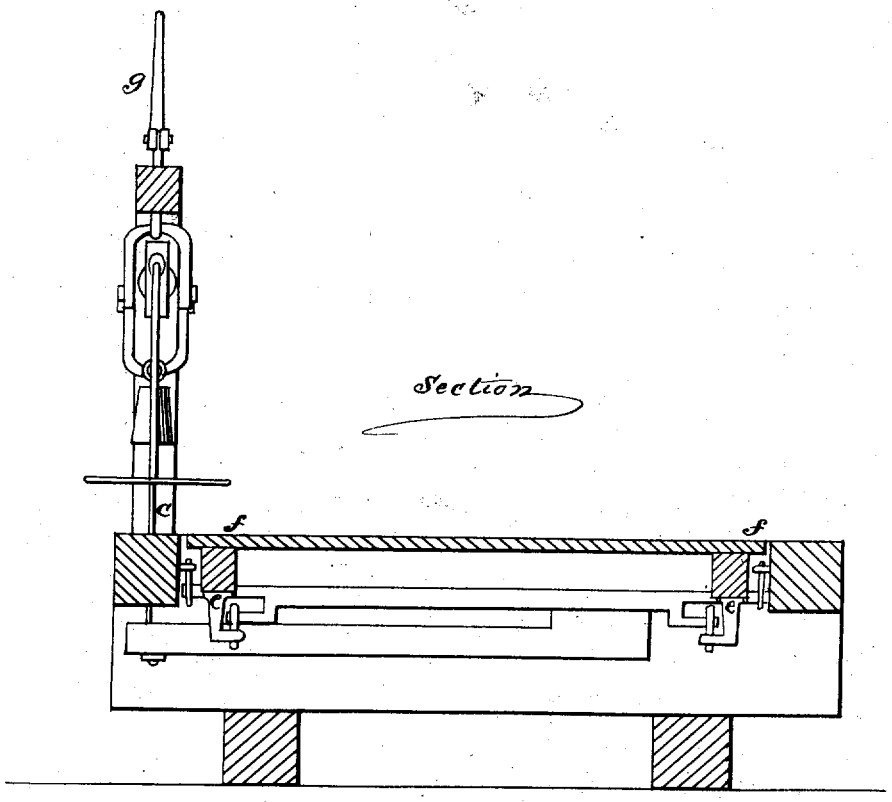
Detail
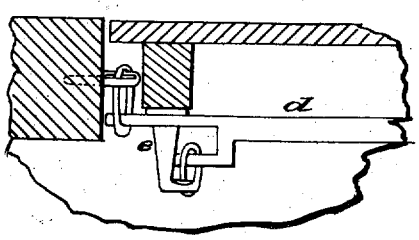

9077X                                        Sept. 9, 1835

Sept. 9. 1835

Jesse Marden of Baltimore State of Maryland (533)

Letters Patent

The schedule referred to in these Letters Patent and making part of the same containing a description in the words of the said Jesse Marden himself of his improvement in scales for weighing articles —

---

To all, to whom these Presents shall come. Be it Known that I. Jesse Marden of the city of Baltimore and state of Maryland have invented a new and useful improvement, in a scale beam or balance and that the following is a full and exact description of the construction and operation of the said improvement as invented by me — My invention consists of an improvement on a machine for weighing articles commonly called the platform Balance now used at the Railroad depot on Pratt street and at other establishments in Baltimore and elsewhere. The general principle of those scales consists of a combination of levers or beams. Two horizontal ones below and an index are above — The end of one of the lower levers is connected with the upper one, at a proper place near the fulcrum by a vertical rod or chain — The main beam below has an axle for its fulcrum running across the frame each end of this axle is forked or branced, each outer branch is suspended from the frame by means of a staple & ring to work in as its fulcrum bearing — On the other end of the frame is a short beam formed and hung so as to correspond with the first — The end of this short beam, rests on the middle of the main beam, These two beams, by means of the inner prongs or branches above named form a seat on which lies the platform — Now, my improvement consists in forming a downward projection from the side pieces of the platform so as to get room to suspend the platform, by means of rings or links & staples, from the inner prongs of the fulcrums, by which the platform hangs perfectly free, and will play in any direction as if hung on chains

9077X or ropes always finding its centre of gravity & not be liable to get out
of place or order. Whereas in the other plan where the platform rests
immediately on the prongs or beam, if the platform gets moved either
way, as it is sure to do, it shifts the points of bearings, throws the platform
out of its proper place and position subjects the machine to untruth, and
wears the bearings and soon puts the whole apparatus out of order. By
suspending the platform I preserve an ample sufficiency of room
without sacrificing convenience and by this mode of suspension, I
secure the perfection and accuracy of the bearings and consequently
long preserve the truth and use of the instrument. I use a lever
above the upper beam to raise the scales from their bearings, whilst
the platform is loading and unloading. Some persons have regulated
the upperbeam by means of a horizontal screw on which a weight
is turned the weight being turned with the hand, whilst the screw
remains stationary. I turn the screw by means of one end projec-
ting with a thumb point, the weight slides backward and forward
as the screw is turned. This plan is perfectly handy, whereas the
other is incommoded by the interference of the stand and other fix-
tures being in the way. I claim the manner of constructing the
platform so as to project downwards for the purposes & advantages
above specified.

Witnesses
Geo. S. Eichelberger
John W. Post

Jesse Marden

[illegible]

(669 words)